(12) United States Patent
Neff et al.

(10) Patent No.: US 7,108,404 B1
(45) Date of Patent: Sep. 19, 2006

(54) VENTED LIGHT FIXTURE

(75) Inventors: Gregory A. Neff, Granger, IN (US);
Todd W. Yeoman, Osceola, IN (US)

(73) Assignee: American Technology Components Incorporated, Elkhart, IN (US)

( * ) Notice: Subject to any disclaimer, the term of this patent is extended or adjusted under 35 U.S.C. 154(b) by 349 days.

(21) Appl. No.: 10/252,260

(22) Filed: Sep. 23, 2002

Related U.S. Application Data

(60) Provisional application No. 60/341,432, filed on Dec. 13, 2001.

(51) Int. Cl.
*F21V 29/00* (2006.01)

(52) U.S. Cl. ...................................... 362/373; 362/545
(58) Field of Classification Search ................ 362/373, 362/545, 499, 540, 541, 394, 580, 547, 126, 362/218, 264, 294, 345
See application file for complete search history.

(56) References Cited

U.S. PATENT DOCUMENTS

| 4,845,600 | A | * | 7/1989 | Matsumura et al. | ......... 362/547 |
| 4,937,717 | A | * | 6/1990 | Betzvog, Jr. | ................ 362/373 |
| 5,062,027 | A | * | 10/1991 | Machida et al. | ............ 362/541 |
| 5,134,554 | A | * | 7/1992 | Donato et al. | .............. 362/226 |
| 5,258,898 | A | * | 11/1993 | Thornton | ..................... 362/394 |
| 5,688,042 | A | * | 11/1997 | Madadi et al. | .............. 362/240 |
| 5,700,080 | A | * | 12/1997 | Okuda | ........................ 362/496 |
| 6,452,336 | B1 | * | 9/2002 | Dandu | ........................ 362/364 |

\* cited by examiner

*Primary Examiner*—Ali Alavi
*Assistant Examiner*—Bao Q Truong
(74) *Attorney, Agent, or Firm*—Botkin & Hall, LLP

(57) ABSTRACT

A flexible sheath is attached over the wire opening in a light fixture housing. The wire leads pass freely through the sheath so as to allow air to enter between the sheath and leads into the housing. Such passage of air flow to and from the fixture housing aids in the prevention of condensation within the interior of the housing.

1 Claim, 8 Drawing Sheets

VENTED LIGHT FIXTURE

CROSS-REFERENCE TO RELATED APPLICATION

This is a continuation of provisional application number 60/341,432 filed Dec. 13, 2001.

SUMMARY OF THE INVENTION

This invention relates to a light fixture and will have particular application to a light fixture which provides airflow to and from the interior of the fixture housing.

Heretofore, the current industry standard used an epoxy or similar sealant material to seal around the wire leads where they enter the fixture housing in order to prevent debris and other harmful substances from entering the light fixture and potentially damaging the fixture. However, there is a problem associated with such practice. There is a potential for the buildup of condensation within the light fixture due to the sealed nature of the air filled fixture. Also, due to pressure differences between the inside atmosphere (caused by heat within the light fixture) and the outside atmosphere, the pressure differences can cause a vacuum thus drawing moist air through voids in the industry's current seal.

In this invention a flexible sheath is attached over the wire opening in the fixture housing. The wire leads pass freely through the sheath so as to allow air to enter between the sheath and leads into the housing. Such passage of air flow to and from the fixture housing aids in the prevention of condensation within the interior of the housing by equalizing pressure.

Therefore it is an object of this invention to provide a light fixture allowing the passage of airflow to and from the interior of the fixture housing thereby eliminating the potential for condensation within the light fixture.

Additionally it is an object of this invention to provide greater protection for the wire leads of the light fixture by guarding such leads against chaffing and sharp edges.

Other objects of this invention will become apparent upon a reading of the following description.

BRIEF DESCRIPTION OF THE DRAWINGS

FIG. 1 (*b*) is a longitudinal sectional view of the flexible wire sheath.

FIG. 1 (*c*) is an end view of the flexible wire sheath.

DESCRIPTION OF THE PREFERRED EMBODIMENT

Figure 1:
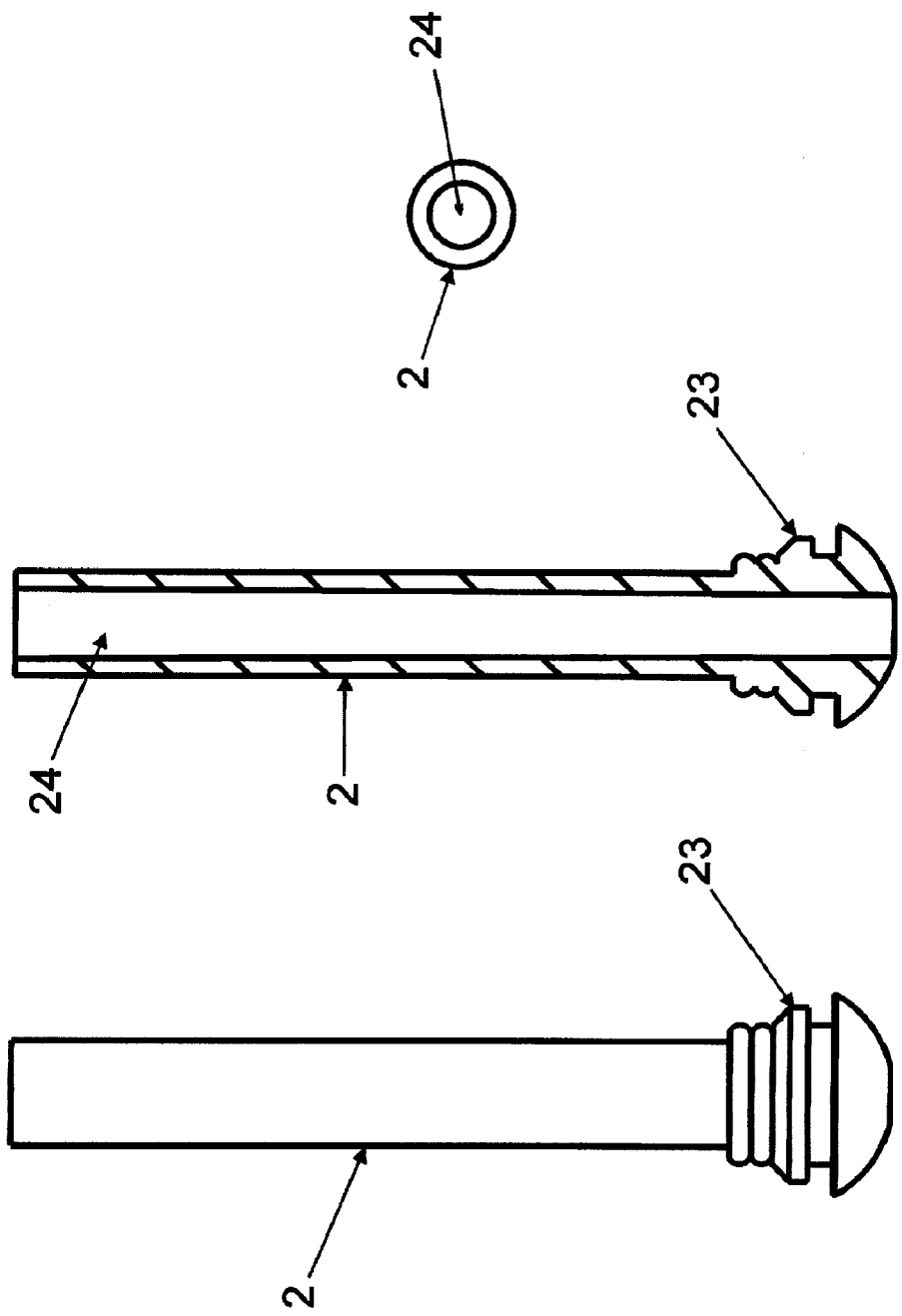
FIG. 1 (*a*) is a side view of a flexible wire sheath.
Figure 2:
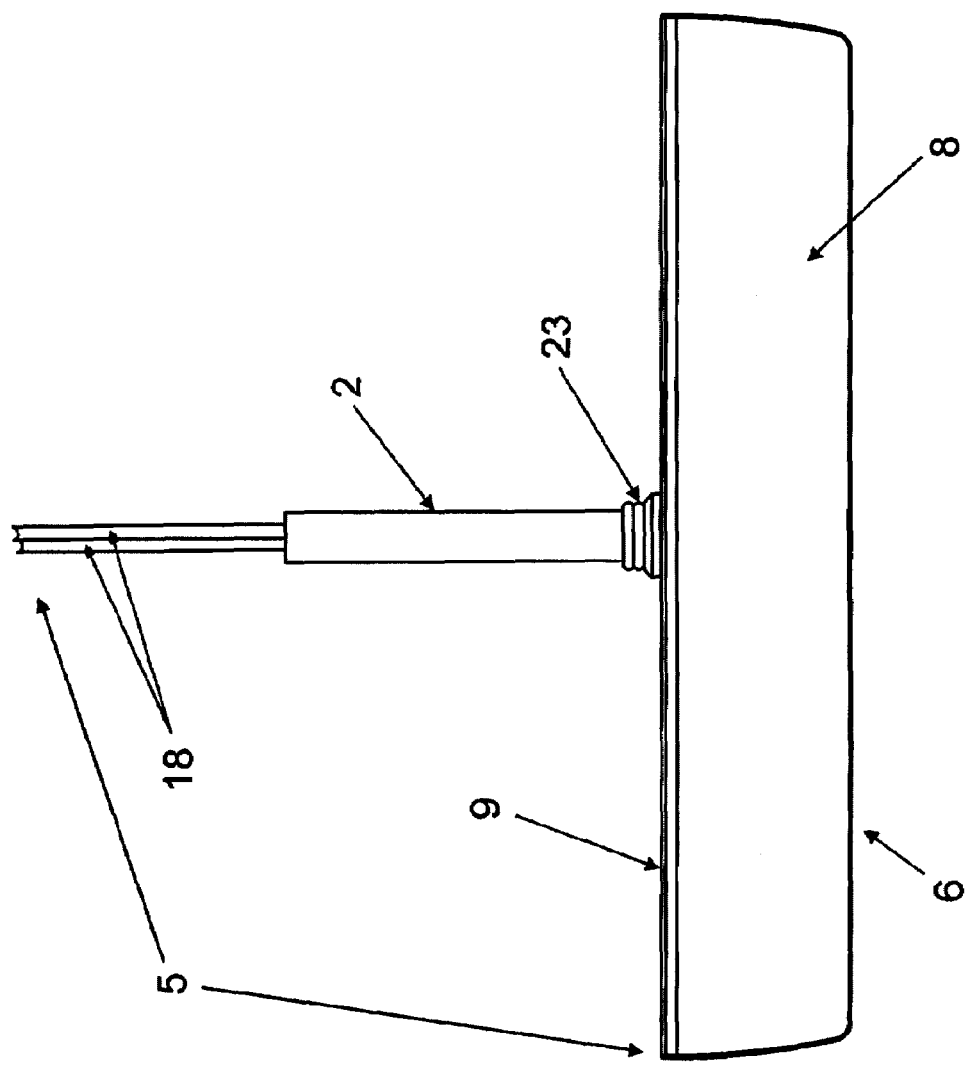
FIG. 2 is a top plan view of the lighting fixture illustrating the use of the flexible wire sheath.
Figure 3:
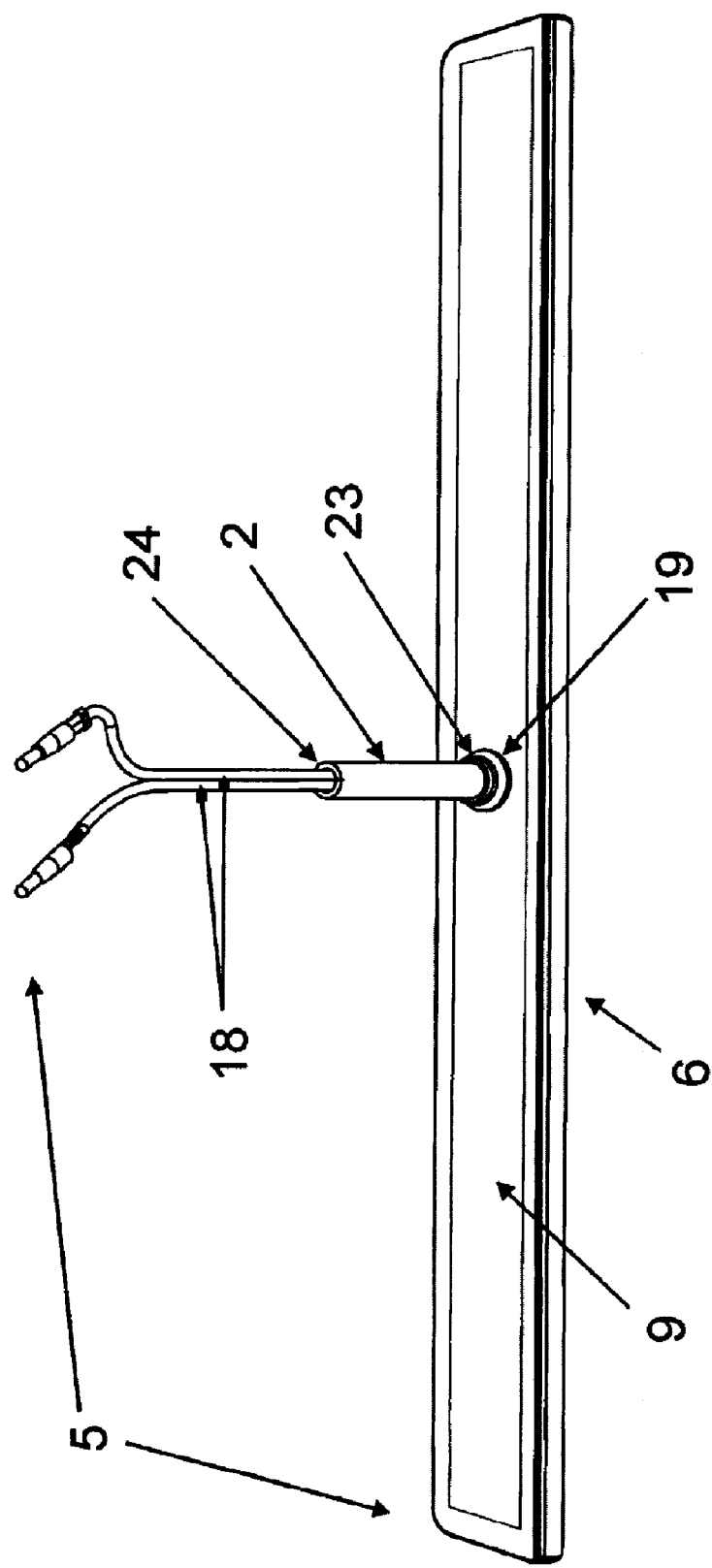
FIG. 3 is a rear view of the lighting fixture.
Figure 4:
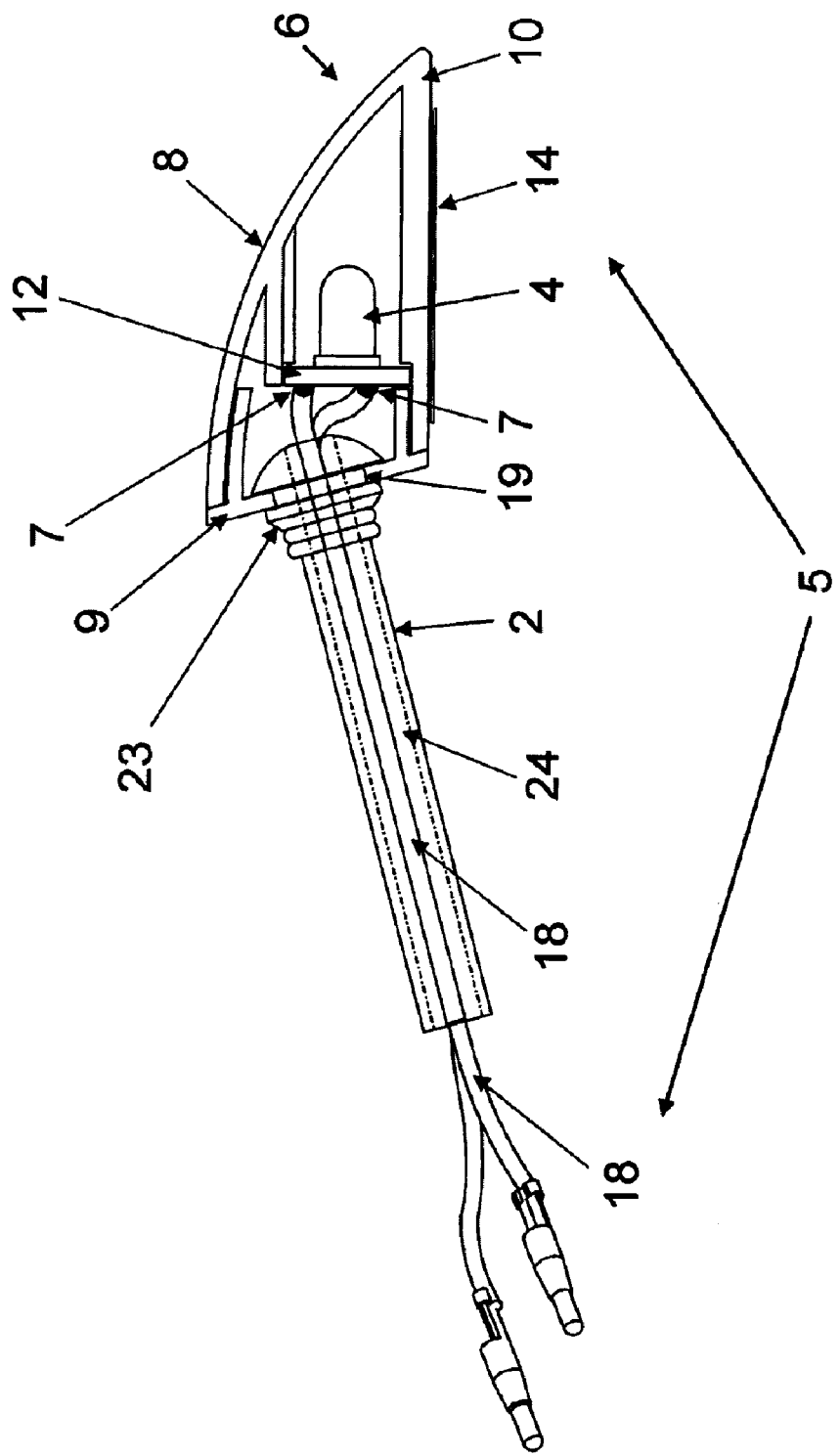
FIG. 4 is a cross-sectional view of the lighting fixture showing the attachment of the flexible wire sheath to the fixture housing.
Figure 5:
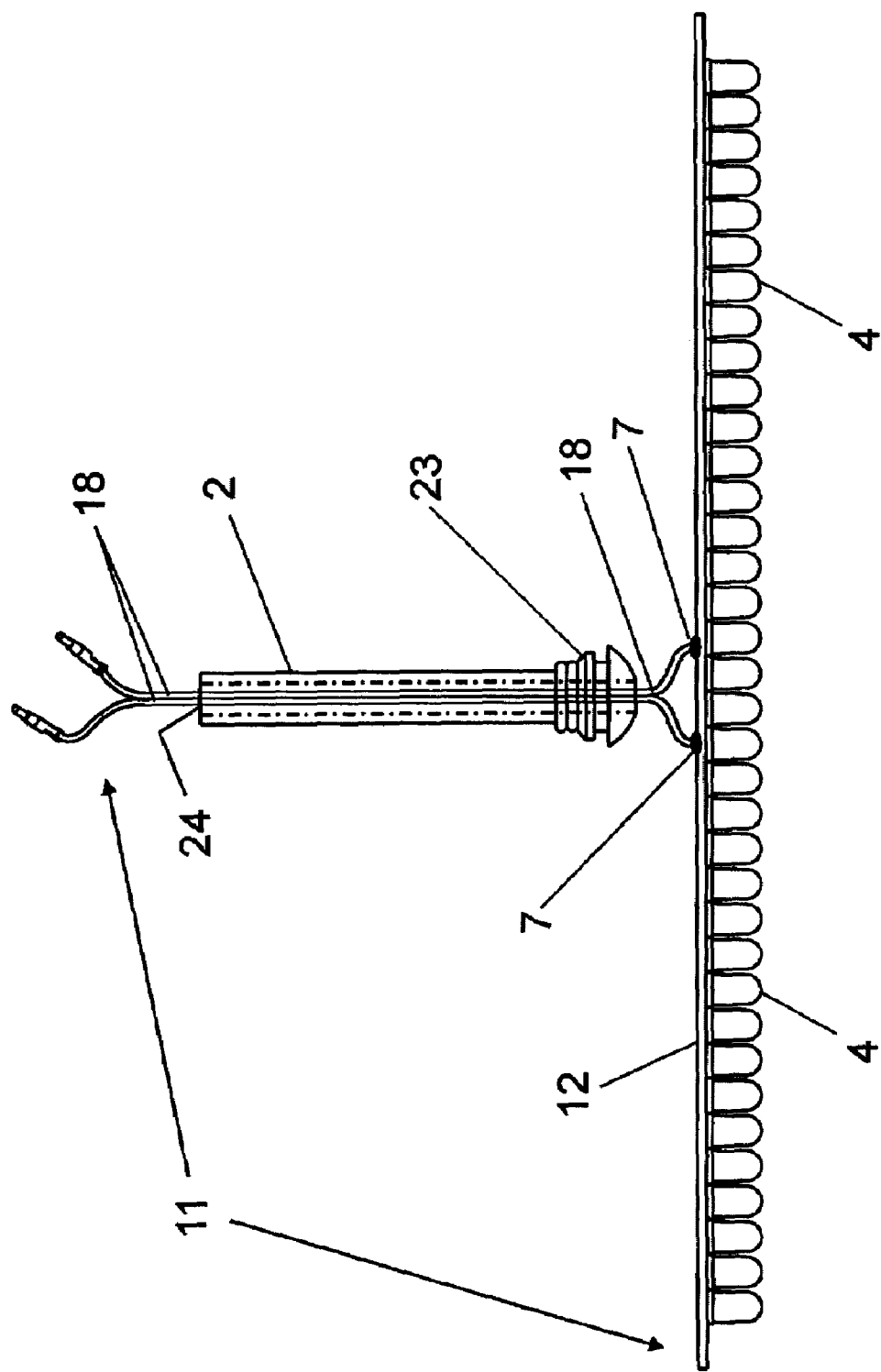
FIG. 5 is a view of the flexible wire sheath in relation to the LED lights, dual bus bar and the wire leads of the light fixture.
Figure 6:
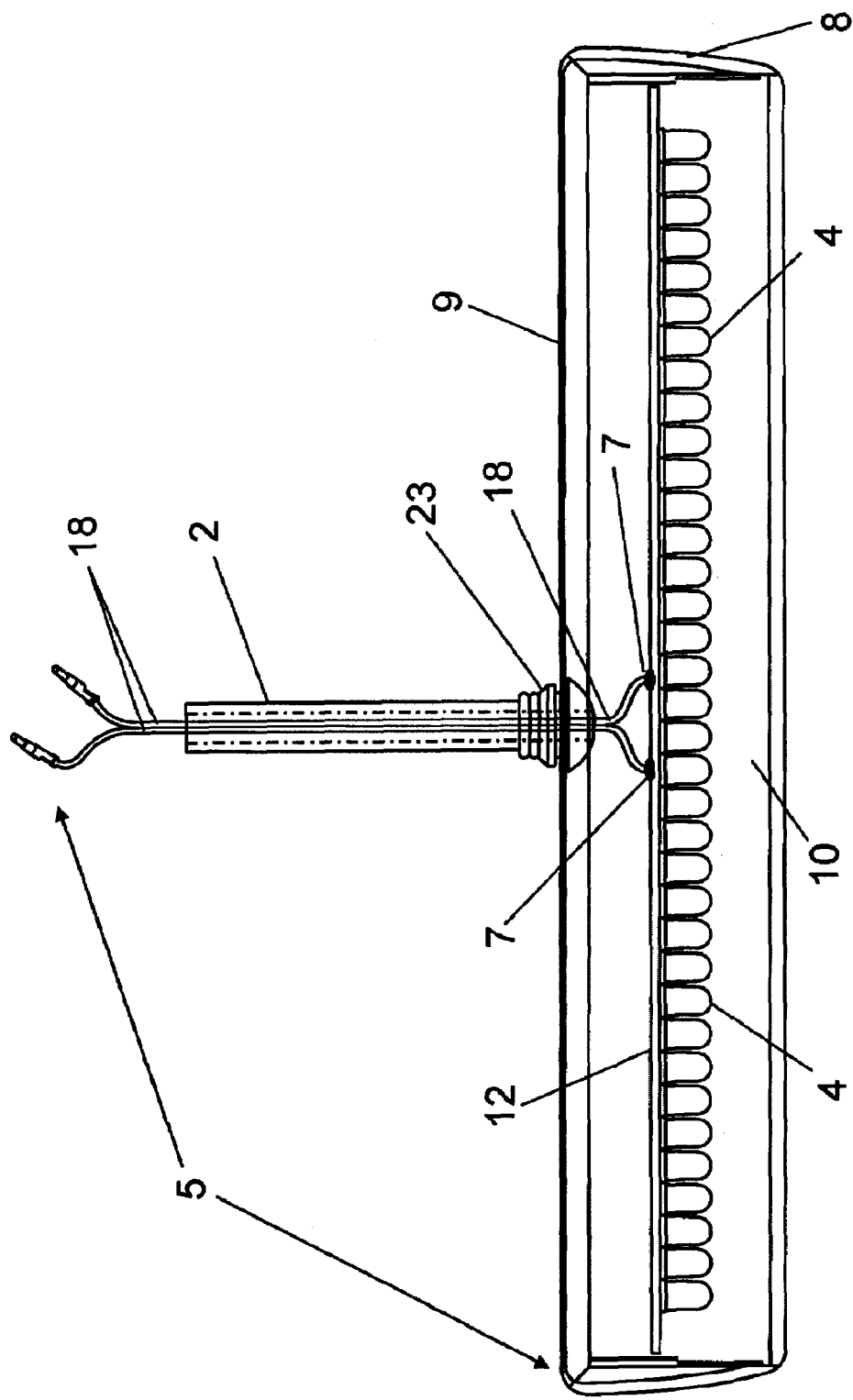
FIG. 6 is a bottom view of the light fixture as seen in through its lens.
Figure 7:
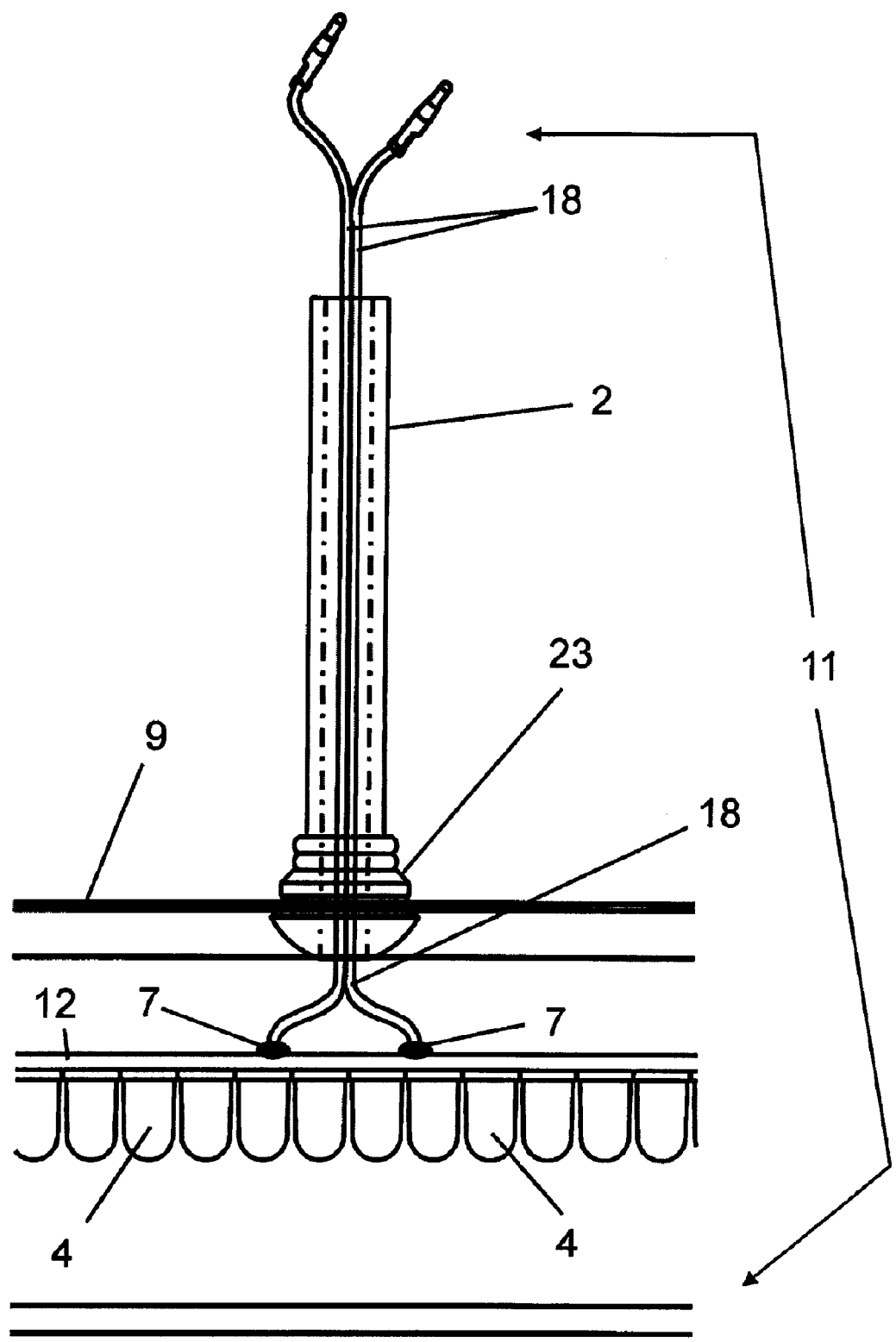
FIG. 7 is a detailed view of a portion of the light fixture as seen in FIG. 6.
Figure 8:
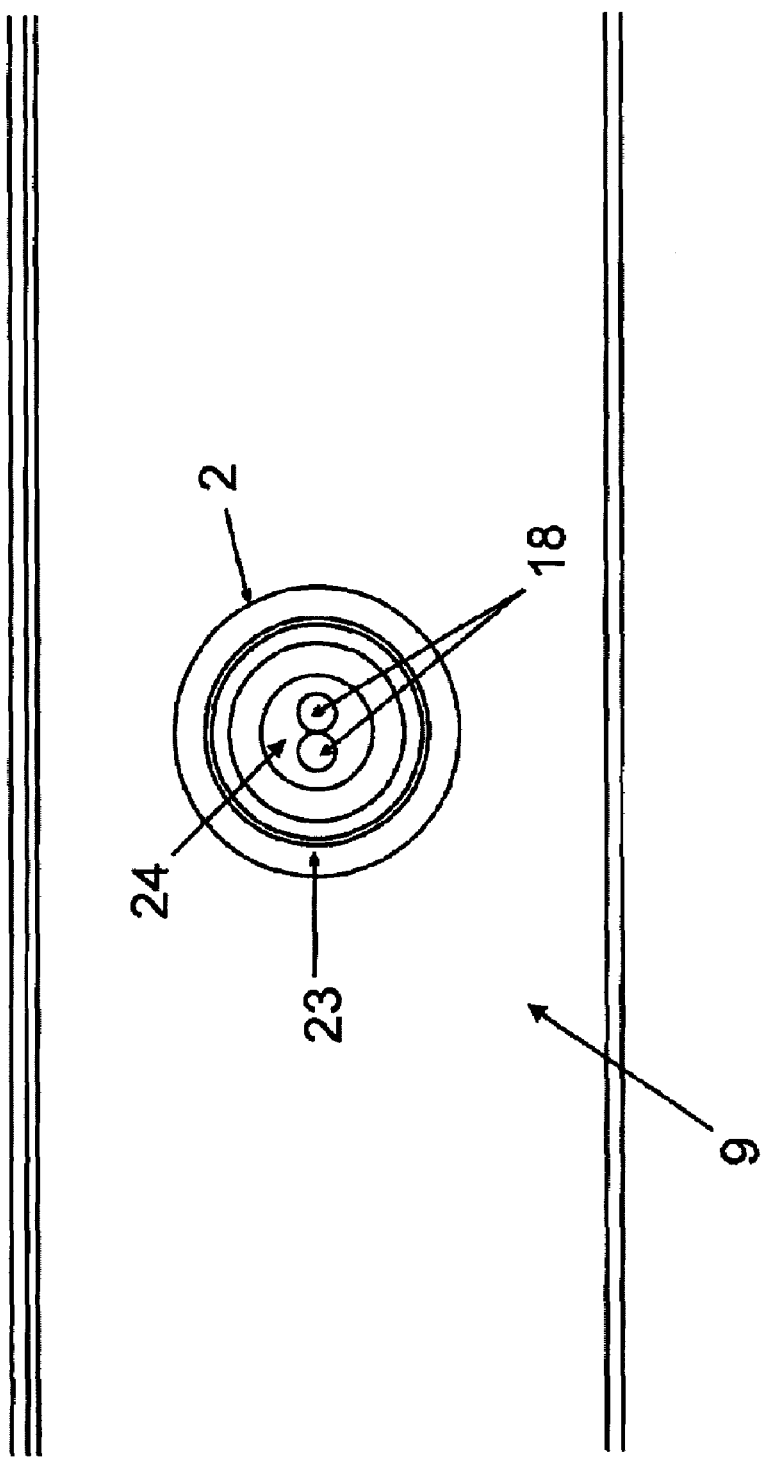
FIG. 8 is a fragmentary rear view of the light fixture illustrating the clearance of the wire leads within the sheath.

The preferred embodiment illustrated is not intended to be exhaustive or to limit the invention to precise forms herein described but rather it is chosen in order to enable one having ordinary skill in the art to produce and to use the invention.

This invention relates to a lighting fixture shown as an automotive center high mount rear stop light or lamp 5. Stop lamp 5 is made up of housing 6 and a lighting component 11. Housing 6 includes a curved lens 8, side walls 9 and 10, and end walls 12. When joined together, lens 8 which may be formed of poly carbonate, and side walls 9 and 10 form the triangular shape of housing 6, allowing for the accommodation of lighting component 11. An adhesive strip 14 is carried by wall 10 to provide a mechanism in which to mount the lamp to a vehicle ceiling or a wall.

Lighting component 11 is made up of a printed circuit board in the form of dual conductive bus bars 12, LED lights 4, and lead wires 18. Lights 4 are soldered to the bus bars 12 with one lead of each light connected to one bus bar and the other lead of each light connected to the other bus bar so that the lights are in parallel. The positive and negative wire leads 18 are soldered at 7, each to a bus bar 12.

Lamp 5 includes a flexible sheath 2 preferably made of a polyurethane material and having an axial extending opening 24 defined at one end by a flanged grommet 23. A hole 19 is formed side of wall 9 of the lamp housing. Sheath 2 at its grommet 23 makes seating engagement with housing hole 19. Wire leads 18 pass with clearance through sheath opening 24. This clearance between sheath 2 and wire leads 18 within sheath opening 24 allows the venting of the interior of lamp housing 6, thus preventing condensation within the lamp.

We claim:

1. A light fixture comprising a housing, said housing including a side wall, having a hole therein, a flexible sheath, said sheath connected to said housing at said hole therein, a lighting within said housing, lead wires connected to said lighting and passing through said sheath with clearance, said clearance providing a passage whereby air may pass out from and into said housing between said lead wires and said sheath through said hole by way of said clearance, said sheath terminating at an end in a grommet, said grommet engaging said housing about said hole through therein to secure the sheath to the housing.

* * * * *